US008402459B2

(12) United States Patent  (10) Patent No.: US 8,402,459 B2
Doui                         (45) Date of Patent:     Mar. 19, 2013

(54) LICENSE MANAGEMENT SYSTEM, LICENSE MANAGEMENT COMPUTER, LICENSE MANAGEMENT METHOD, AND LICENSE MANAGEMENT PROGRAM EMBODIED ON COMPUTER READABLE MEDIUM

(75) Inventor: Takayuki Doui, Kawanishi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 611 days.

(21) Appl. No.: 12/706,110

(22) Filed: Feb. 16, 2010

(65) Prior Publication Data

US 2010/0211945 A1   Aug. 19, 2010

(30) Foreign Application Priority Data

Feb. 18, 2009   (JP) .................................. 2009-035437

(51) Int. Cl.
*G06F 9/445* (2006.01)
(52) U.S. Cl. .......................................... 717/176; 726/26
(58) Field of Classification Search .................. 717/176; 726/26
See application file for complete search history.

(56) References Cited

U.S. PATENT DOCUMENTS

| | | | |
|---|---|---|---|
| 5,671,412 A * | 9/1997 | Christiano | 1/1 |
| 6,199,204 B1 * | 3/2001 | Donohue | 717/178 |
| 6,775,830 B1 * | 8/2004 | Matsunami et al. | 717/176 |
| 7,506,382 B2 * | 3/2009 | Padole et al. | 726/30 |
| 7,865,445 B2 * | 1/2011 | Maeda | 726/26 |
| 2004/0003390 A1 * | 1/2004 | Canter et al. | 717/178 |
| 2004/0177354 A1 | 9/2004 | Gunyakti et al. | |
| 2004/0205261 A1 * | 10/2004 | Osada | 717/172 |
| 2005/0050347 A1 * | 3/2005 | Hsuan | 713/200 |
| 2008/0005029 A1 * | 1/2008 | Ando | 705/51 |
| 2009/0126024 A1 * | 5/2009 | Himeno | 726/26 |

FOREIGN PATENT DOCUMENTS

| | | |
|---|---|---|
| EP | 1 455 258 A2 | 9/2004 |
| EP | 1552379 A1 * | 7/2005 |
| JP | 11-024918 A | 1/1999 |
| JP | 2005-189913 | 7/2005 |
| JP | 2005-208935 | 8/2005 |

(Continued)

OTHER PUBLICATIONS

"Software license management with smart cards"; T. Aura and D. Gollman; Proceedings of the USENIX Workshop on Smartcard Tehcnology, 1999, pp. 75-85.*

(Continued)

*Primary Examiner* — Wei Zhen
*Assistant Examiner* — Junchun Wu
(74) *Attorney, Agent, or Firm* — Buchanan Ingersoll & Rooney PC

(57) ABSTRACT

In order to facilitate a change of a computer into which an application program is to be installed, a license management computer stores management information, and in receipt of an installation request from an installation computer, it extracts the management information corresponding to the installation request. When there is no relevant management information, the license management computer generates and stores new management information, and permits installation of the application program to the installation computer. When the relevant management information is extracted, the license management computer compares device identification information and external device identification information included in the installation request with device identification information and external device identification information included in the extracted management information, and if at least one of the device identification information and the external device identification information matches the corresponding one, the license management computer permits installation of the application program to the installation computer.

16 Claims, 11 Drawing Sheets

FOREIGN PATENT DOCUMENTS

| | | |
|---|---|---|
| JP | 2005-321850 | 11/2005 |
| JP | 2005-327196 A | 11/2005 |
| JP | 2008-004010 | 1/2008 |
| JP | 2008-257406 | 10/2008 |
| WO | WO 98/42098 | 9/1998 |

OTHER PUBLICATIONS

"Installation and Licensing Guide"; ITT Visual Information Solutions; Nov. 2007.*

"Installation and Configuration Guide"; Software Usage Analysis; IBM; 2003.*

European Search Report dated Jul. 28, 2010, issued by the European Patent Office in corresponding European Patent Application No. 10 001 537.

Office Action (Notice of Ground of Rejection) dated Oct. 26, 2010, issued in the corresponding Japanese Patent Application No. 2009-035437, and an English Translation thereof.

* cited by examiner

F I G. 5

MANAGEMENT INFORMATION

| PROGRAM IDENTIFICATION INFORMATION | DEVICE IDENTIFICATION INFORMATION | EXTERNAL DEVICE IDENTIFICATION INFORMATION |
|---|---|---|

FIG. 7

EXTERNAL DEVICE IDENTIFICATION INFORMATION

| MANAGED DEVICE 1 | MANAGED DEVICE 2 | MANAGED DEVICE 3 | ... | MANAGED DEVICE N |
|---|---|---|---|---|

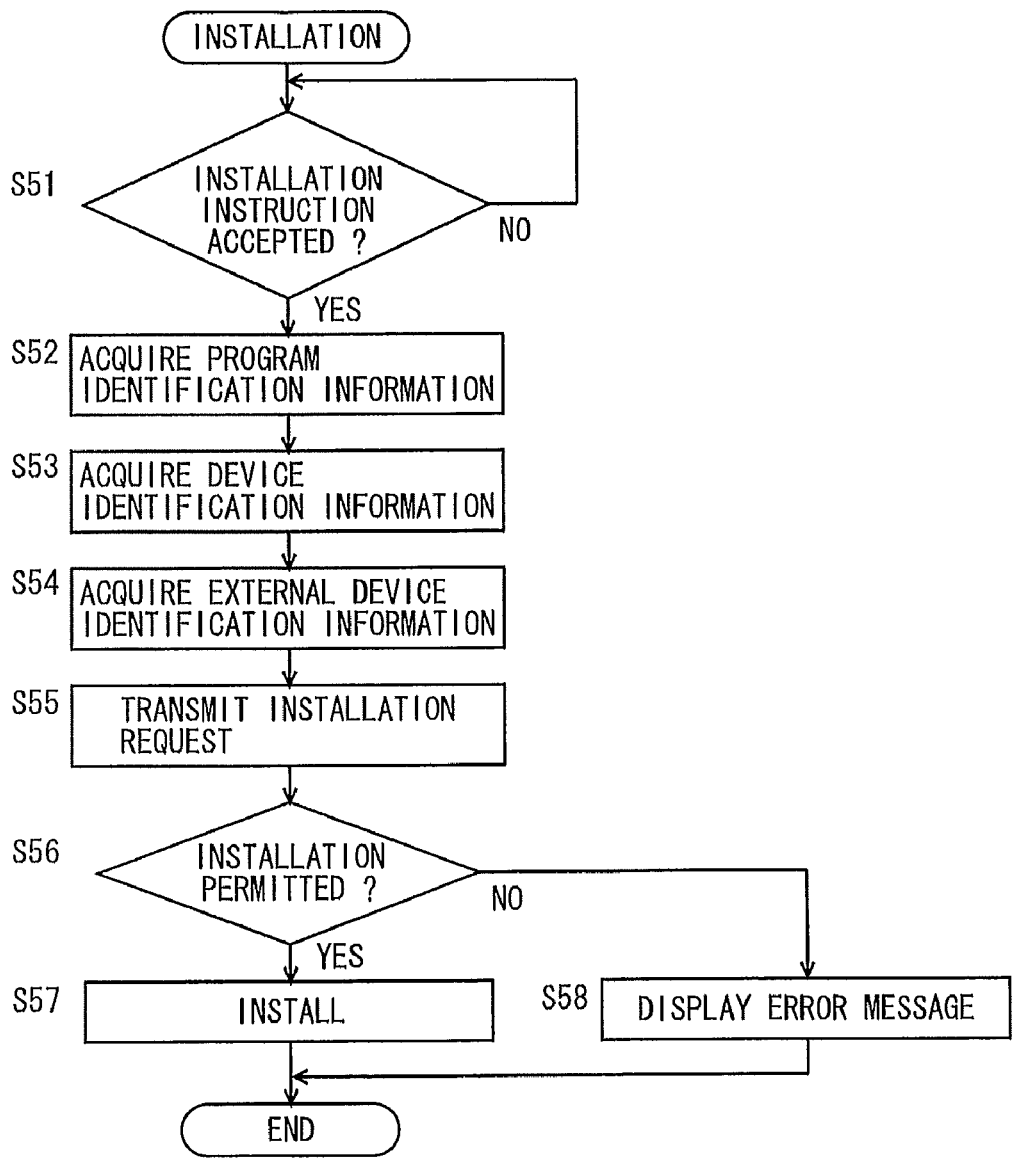
F I G. 1 0

LICENSE MANAGEMENT SYSTEM, LICENSE MANAGEMENT COMPUTER, LICENSE MANAGEMENT METHOD, AND LICENSE MANAGEMENT PROGRAM EMBODIED ON COMPUTER READABLE MEDIUM

This application is based on Japanese Patent Application No. 2009-035437 filed with Japan Patent Office on Feb. 18, 2009, the entire content of which is hereby incorporated by reference.

BACKGROUND OF THE INVENTION

1. Field of the Invention

The present invention relates to a license management system, a license management computer, a license management method, and a license management program embodied on a computer readable medium. More particularly, the present invention relates to a license management system, a license management computer, and a license management method for managing a program installed into a computer, and a license management program embodied on a computer readable medium for causing the license management computer to carry out the license management method.

2. Description of the Related Art

Recently, a method of using an installation computer to manage a program installed into a computer is known. Japanese Patent Laid-Open No. 11-024918 discloses a license management system for non-free (chargeable) software. According to this system, when chargeable software is installed, a media access control (MAC) address of a client is recorded on chargeable data as a system number and the chargeable data is transmitted to a server. In the server, a serial number of the chargeable software, the number of licenses, and the system number are registered. Thereafter, when chargeable software is to be started on the client, the chargeable data is read and the system number in the chargeable data is compared with the MAC address of the client. If it is confirmed that the software is the chargeable software that has been installed into the client, an inquiry as to whether the condition of the number of licenses is satisfied is made to the server computer. When data indicating that the software can be started is received from the server computer, the requested chargeable software is started.

With the license management system disclosed in Japanese Patent Application Laid-Open No. 11-024918, however, the MAC address of a computer into which a program is installed is managed by a server. If the computer into which the program has been installed suffers a breakdown and the program needs to be installed into another computer, it is necessary to request an administrator of the server to change the MAC address.

SUMMARY OF THE INVENTION

The present invention has been accomplished in view of the foregoing problem, and an object of the present invention is to provide a license management system which facilitates a change of a computer into which an application program is installed.

Another object of the present invention is to provide a license management computer which facilitates a change of a computer into which an application program is installed.

A further object of the present invention is to provide a license management method which facilitates a change of a computer into which an application program is installed.

Yet another object of the present invention is to provide a license management program embodied on a computer readable medium which facilitates a change of a computer into which an application program is installed.

To achieve the above-described objects, according to an aspect of the present invention, a license management system includes an installation computer and a license management computer connected via a network, the license management computer being configured to manage an application program installed into the installation computer, wherein the installation computer includes: an installation request transmitting portion to transmit an installation request to the license management computer for installing the application program, the installation request including program identification information for identifying the application program, device identification information for identifying the installation computer, and external device identification information for specifying an external device connected to the installation computer via the network; and an installation portion to install the application program on the condition that the license management computer permits installation of the application program in response to the installation request transmitted, and wherein the license management computer includes: a management information storing portion to store management information, the management information including the program identification information, the device identification information, and the external device identification information; an installation request receiving portion to receive the installation request that the installation computer transmits to the license management computer before installation of the application program; an installation-time extracting portion to extract, from the management information storing portion, the management information including the same program identification information as the program identification information included in the received installation request; a management information generating portion, in the case where the management information including the same program identification information as the program identification information included in the received installation request is not extracted by the installation-time extracting portion, to generate and store management information including the program identification information, the device identification information, and the external device identification information which are included in the received installation request; an installation-time comparing portion, in the case where the management information including the same program identification information as the program identification information included in the received installation request is extracted by the installation-time extracting portion, to compare the device identification information and the external device identification information included in the received installation request respectively with the device identification information and the external device identification information included in the extracted management information; an installation-time updating portion, in the case where the installation-time comparing portion determines that one of the device identification information and the external device identification information included in the received installation request matches the corresponding one of the device identification information and the external device identification information included in the extracted management information and the other does not match the corresponding information, to update the device identification information and the external device identification information included in the extracted management information with the device identification information and the external device identification information included in the installation request; and an installation management portion configured to permit installation of the application program to the installation computer in the case where the management information including the same program identification information as the program identification information included in the received installation request is not extracted by the installation-time extracting portion, or in the case where the management information including the same program identification information as the program identification information included in the received installation request is extracted by the installation-time extracting portion and the installation-time comparing portion determines that at least one of the device identification information and the external device identification information included in the received installation request matches the corresponding one of the device identification information and the external device identification information included in the extracted management information.

According to another aspect of the present invention, a license management computer is for managing an application program which is installed into an installation computer connected to the license management computer via a network, wherein the license management computer includes: a management information storing portion to store management information, the management information including program identification information for identifying an application program, device identification information for identifying the installation computer into which the application program is installed, and external device identification information for specifying an external device connected to the installation computer via the network; an installation request receiving portion to receive an installation request that the installation computer transmits to the license management computer for installing the application program, the installation request including program identification information for identifying the application program to be installed, device identification information for identifying the installation computer, and the external device identification information; an installation-time extracting portion to extract, from the management information storing portion, the management information including the same program identification information as the program identification information included in the received installation request; a management information generating portion, in the case where the management information including the same program identification information as the program identification information included in the received installation request is not extracted by the installation-time extracting portion, to generate and store management information including the program identification information, the device identification information, and the external device identification information which are included in the received installation request; an installation-time comparing portion, in the case where the management information including the same program identification information as the program identification information included in the received installation request is extracted by the installation-time extracting portion, to compare the device identification information and the external device identification information included in the received installation request respectively with the device identification information and the external device identification information included in the extracted management information; an installation-time updating portion, in the case where the installation-time comparing portion determines that one of the device identification information and the external device identification information included in the received installation request matches the corresponding one of the device identification information and the external device identification information included in the extracted management information and the other does not match the corresponding information, to update the device identification information and the external device identification information included in the extracted management information with the device identification information and the external device identification information included in the installation request; and an installation management portion configured to permit installation of the application program to the installation computer in the case where the management information including the same program identification information as the program identification information included in the received installation request is not extracted by the installation-time extracting portion, or in the case where the management information including the same program identification information as the program identification information included in the received installation request is extracted by the installation-time extracting portion and the installation-time comparing portion determines that at least one of the device identification information and the external device identification information included in the received installation request matches the corresponding one of the device identification information and the external device identification information included in the extracted management information.

According to a further aspect of the present invention, a license management method is performed by a license management computer connected to an installation computer in a communicable manner, the license management computer including a management information storing portion to store management information, the management information including program identification information for identifying an application program, device identification information for identifying the installation computer into which the application program is installed, and external device identification information for specifying an external device connected to the installation computer via a network, wherein the method includes: a receiving step of receiving an installation request that the installation computer transmits to the license management computer for installing an application program, the installation request including program identification information for identifying the application program to be installed, device identification information for identifying the installation computer, and external device identification information related to the installation computer; an installation-time extracting step of extracting, from the management information storing portion, the management information including the same program identification information as the program identification information included in the received installation request; a storing step of, in the case where the management information including the same program identification information as the program identification information included in the received installation request is not extracted in the installation-time extracting step, generating management information including the program identification information, the device identification information, and the external device identification information included in the received installation request and storing the generated management information in the management information storing portion; an installation-time comparing step of, in the case where the management information including the same program identification information as the program identification information included in the received installation request is extracted in the installation-time extracting step, comparing the device identification information and the external device identification information included in the received installation request respectively with the device identification information and the external device identification information included in the extracted management information; an updating step of, in the case where it is determined in the installation-time comparing step that one of the device identification information and the external device identification information included in the received installation request matches the corresponding one of the device identification information and the external device identification information included in the extracted management information and the other does not match the corresponding information, updating the device identification information and the external device identification information included in the extracted management information with the device identification information and the external device identification information included in the installation request; and a permitting step of permitting installation of the application program to the installation computer in the case where the management information including the same program identification information as the program identification information included in the received installation request is not extracted in the installation-time extracting step, or in the case where the management information including the same program identification information as the program identification information included in the received installation request is extracted in the installation-time extracting step and it is determined in the installation-time comparing step that at least one of the device identification information and the external device identification information included in the received installation request matches the corresponding one of the device identification information and the external device identification information included in the extracted management information.

According to yet another aspect of the present invention, a license management program embodied on a computer readable medium is executed in a license management computer connected to an installation computer in a communicable manner, the license management computer including a management information storing portion to store management information, the management information including program identification information for identifying an application program, device identification information for identifying the installation computer into which the application program is installed, and external device identification information for specifying an external device connected to the installation computer via a network, wherein the program causes the license management computer to perform: a receiving step of receiving an installation request that the installation computer transmits to the license management computer for installing an application program, the installation request including program identification information for identifying the application program to be installed, device identification information for identifying the installation computer, and external device identification information related to the installation computer; an installation-time extracting step of extracting, from the management information storing portion, the management information including the same program identification information as the program identification information included in the received installation request; a storing step of, in the case where the management information including the same program identification information as the program identification information included in the received installation request is not extracted in the installation-time extracting step, generating management information including the program identification information, the device identification information, and the external device identification information included in the received installation request and storing the generated management information in the management information storing portion; an installation-time comparing step of, in the case where the management information including the same program identification information as the program identification information included in the received installation request is extracted in the installation-time extracting step, comparing the device identification information and the external device identification information included in the received installation request respectively with the device identification information and the external device identification information included in the extracted management information; an updating step of, in the case where it is determined in the installation-time comparing step that one of the device identification information and the external device identification information included in the received installation request matches the corresponding one of the device identification information and the external device identification information included in the extracted management information and the other does not match the corresponding information, updating the device identification information and the external device identification information included in the extracted management information with the device identification information and the external device identification information included in the installation request; and a permitting step of permitting installation of the application program to the installation computer in the case where the management information including the same program identification information as the program identification information included in the received installation request is not extracted in the installation-time extracting step, or in the case where the management information including the same program identification information as the program identification information included in the received installation request is extracted in the installation-time extracting step and it is determined in the installation-time comparing step that at least one of the device identification information and the external device identification information included in the received installation request matches the corresponding one of the device identification information and the external device identification information included in the extracted management information.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows an example of the format of management information.

FIG. 7 shows an example of the format of external device identification information.

FIG. 10 is a flowchart illustrating an example of the flow of an installation process.

DESCRIPTION OF THE PREFERRED EMBODIMENTS

Figure 1:
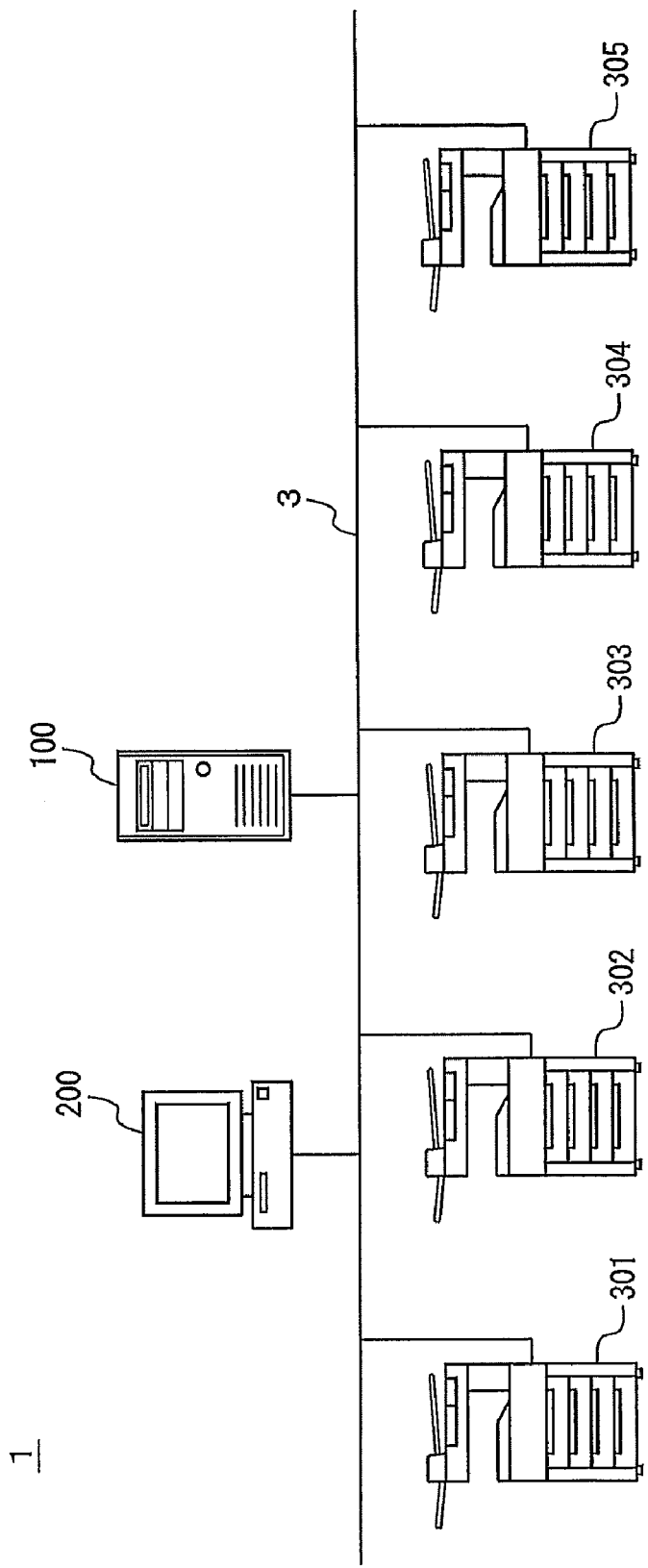
FIG. 1 schematically shows a license management system according to an embodiment of the present invention.

Embodiments of the present invention will now be described with reference to the drawings. In the following description, like reference characters denote like parts, which have like names and functions, and therefore, detailed description thereof will not be repeated.

FIG. 1 schematically shows a license management system according to an embodiment of the present invention. Referring to FIG. 1, a license management system 1 includes a license management computer 100, an installation computer 200 into which an application program is installed, and five multi function peripherals (MFPs) 301 to 305.

License management computer 100 and installation computer 200 are typical computers. Each of five MFPs 301 to 305 is a composite machine, which includes a scanner device for reading an original, and an image forming device and a facsimile device for forming an image on a recording medium such as a sheet of paper based on image data, and has the image reading function, copying function, and facsimile transmitting/receiving function.

License management computer 100, installation computer 200, and five MFPs 301 to 305 are each connected to a network 3, and each assigned an Internet protocol (IP) address as the positional information on network 3. This allows license management computer 100, installation computer 200, and five MFPs 301 to 305 to use the IP addresses assigned to the other parties to communicate with each other via network 3.

License management computer 100 manages such that one application program is installed into one computer. Here, it is assumed that license management computer 100 manages an application program which is installed into installation computer 200. Installation computer 200 has an application program installed therein. Here, it is assumed that, as an example of the application program, an authentication program causing a computer to perform a user authentication process is installed into installation computer 200.

When the authentication program is installed into installation computer 200, a device to be managed by installation computer 200 is determined by a user. Here, it is assumed that five MFPs 301 to 305 are determined to be the devices to be managed. In installation computer 200 into which the authentication program has been installed, the process of authenticating the users who use the five MFPs 301 to 305 is carried out.

Specifically, installation computer 200 which executes the authentication program stores in advance a plurality of user records, each made up of a pair of user identification information and a password, for identifying the users who operate the respective ones of five MFPs 301 to 305. When a user using any of MFPs 301 to 305, e.g. MFP 301, inputs a pair of user identification information and password into MFP 301, MFP 301 transmits the input pair of user identification information and password to installation computer 200. If a user record including the user identification information and password identical to those included in the user record received from MFP 301 has been stored in advance in installation computer 200, installation computer 200 authenticates the user; otherwise, it does not authenticate the user. Installation computer 200 transmits a result of the authentication to MFP 301. MFP 301 which has received the authentication result determines whether to authorize the user to use the device, in accordance with the authentication result.

Installation computer 200 into which the authentication program is installed registers, in advance, device identification information for identifying the respective MFPs 301 to 305, so as to specify the devices to be managed (managed devices). In the case where installation computer 200 receives a pair of user identification information and password from a device other than the ones registered as the managed devices, installation computer 200 does not authenticate that pair of user identification information and password.

While it is assumed in the present embodiment that MFPs 301 to 305 are managed by installation computer 200, the managed devices may include a printer, a facsimile machine, a personal computer, and other devices, as long as they can communicate with installation computer 200 via a network.

Figure 2:
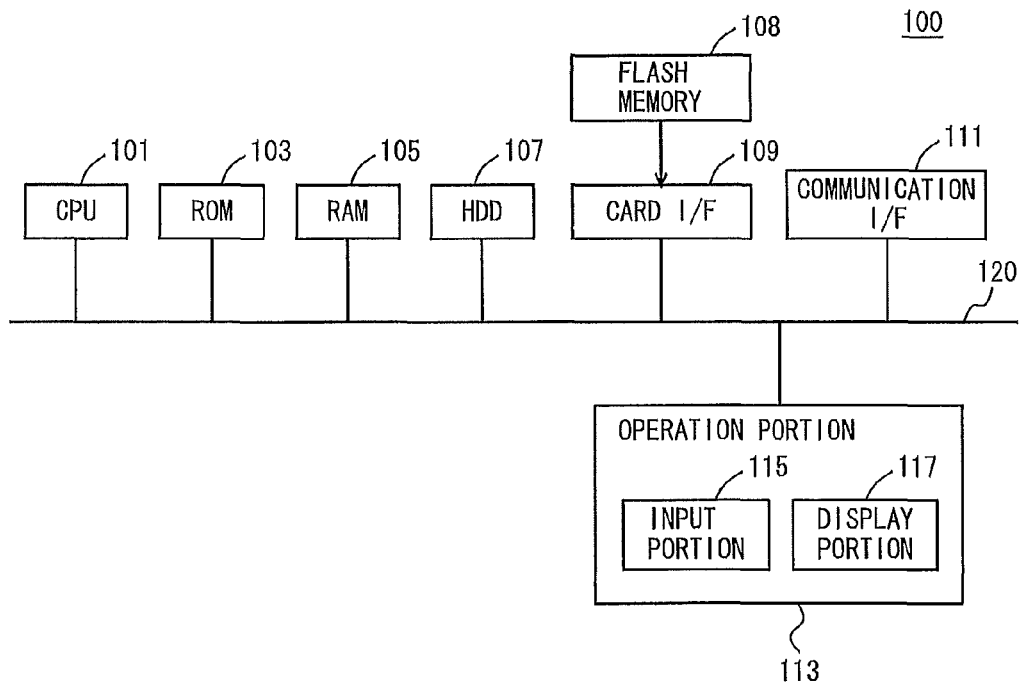
FIG. 2 is a block diagram showing, by way of example, the hardware configuration of a license management computer.

FIG. 2 is a block diagram showing, by way of example, the hardware configuration of the license management computer. Referring to FIG. 2, license management computer 100 includes: a central processing unit (CPU) 101, a read only memory (ROM) 103 which stores therein a program executed by CPU 101 and others, a random access memory (RAM) 105 used as a work area for CPU 101, a hard disk drive (HDD) 107 as a mass storage device, a communication interface (I/F) 111 through which license management computer 100 is connected to network 3, an operation portion 113 which functions as an interface with a user, a card I/F 109 to which a flash memory 108 is mounted, and a bus 120 to which the above elements are connected.

CPU 101 is responsible for overall control of license management computer 100. Further, CPU 101 executes a license management program stored in ROM 103. Alternatively, CPU 101 may load the license management program stored in flash memory 108 via card I/F 109 into RAM 105 for execution.

Operation portion 113 includes an input portion 115 including a keyboard and a pointing device such as a mouse, and a display portion 117 made up, e.g., of a liquid crystal display for displaying data.

It is noted that the recording medium for storing the program to be executed by CPU 101 is not restricted to flash memory 108. It may be a flexible disk, a cassette tape, an optical disc (compact disc-ROM (CD-ROM), magneto-optical (MO) disc, mini disc (MD), digital versatile disc (DVD)), an IC card, an optical card, or a semiconductor memory such as a mask ROM, an erasable and programmable ROM (EPROM), an electrically EPROM (EEPROM), or the like.

Still further, CPU 101 may download the license management program from a computer connected to the Internet and store the same in HDD 107, or a computer connected to the Internet may write the license management program to HDD 107, for execution by CPU 101. As used herein, the license management program includes, not only the program that can be executed directly by CPU 101, but also a source program, a compressed program, an encrypted program, and others.

Figure 3:
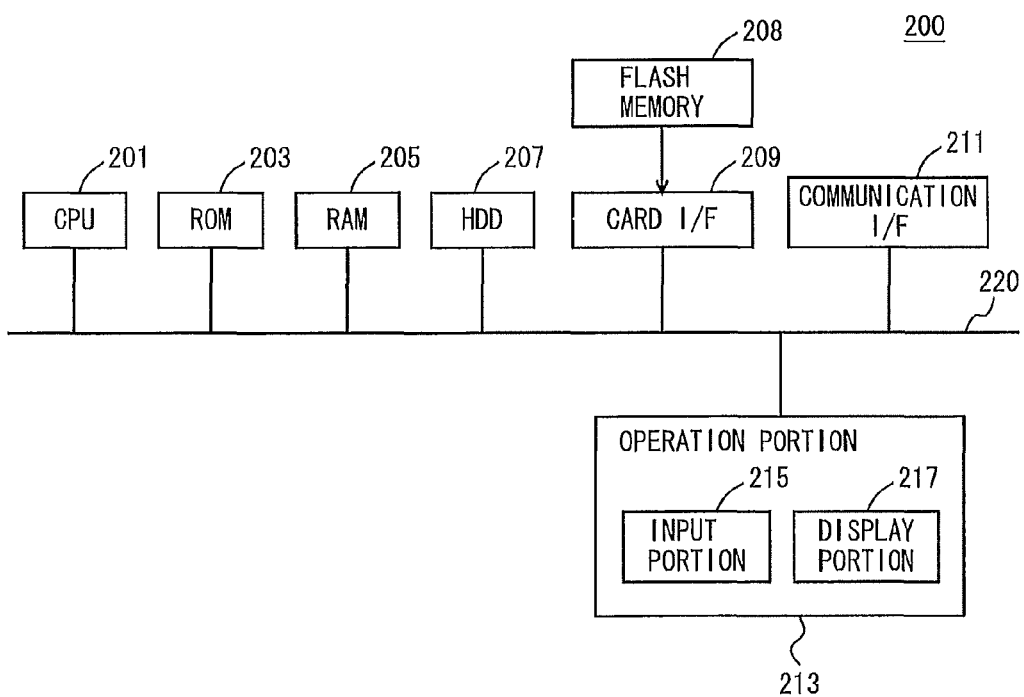
FIG. 3 is a block diagram showing, by way of example, the hardware configuration of an installation computer.

FIG. 3 is a block diagram showing, by way of example, the hardware configuration of the installation computer. Referring to FIG. 3, installation computer 200 includes: a CPU 201, a ROM 203 which stores therein a program executed by CPU 201 and others, a RAM 205 used as a work area for CPU 201, an HDD 207 as a mass storage device, a communication I/F 211 through which installation computer 200 is connected to network 3, an operation portion 213 which functions as an interface with a user, a card I/F 209 to which a flash memory 208 is mounted, and a bus 220 to which the above elements are connected.

CPU 201 is responsible for overall control of installation computer 200. Further, CPU 201 uploads an authentication program stored in flash memory 208 via card I/F 209 into HDD 207, for installation thereof. When the authentication program is installed, the authentication program in the executable form is stored in HDD 207. CPU 201 loads the executable authentication program stored in HDD 207 into RAM 205 for execution.

Operation portion 213 includes an input portion 215 including a keyboard and a pointing device such as a mouse, and a display portion 217 made up, e.g., of a liquid crystal display for displaying data.

It is noted that the recording medium for storing the authentication program to be installed by CPU 201 is not restricted to flash memory 208. It may be a magnetic recording medium, a magneto-optical recording medium, an optical disc, or a semiconductor memory.

Still further, CPU 201 may download the authentication program from a computer connected to network 3 or the Internet and store the same in HDD 207, or a computer connected to the Internet may write the authentication program to HDD 207, for installation by CPU 201.

CPU 201 included in installation computer 200 has part of the license management program installed therein, and executes the part of the license management program. The part of the license management program may be received from license management computer 100 via network 3, or it may be uploaded from flash memory 208 mounted to installation computer 200, so as to be installed into installation computer 200. CPU 201 included in the installation computer executes the part of the license management program to communicate with license management computer 100, and license management computer 100 in turn manages the authentication program installed into installation computer 200. Hereinafter, description will be made as to how the authentication program installed into installation computer 200 is managed by license management computer 100.

Figure 4:
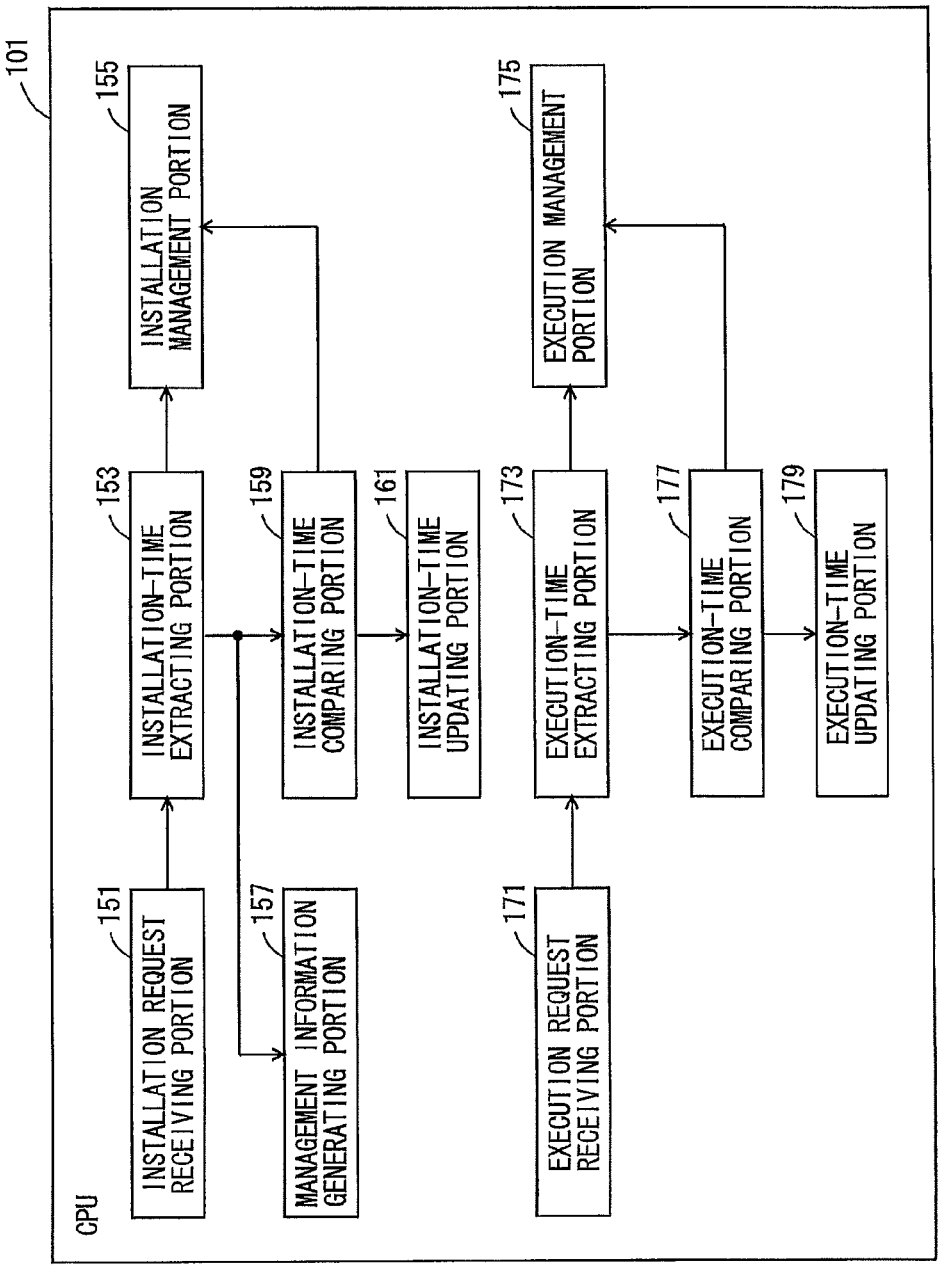
FIG. 4 is a functional block diagram showing, by way of example, the functions of a CPU included in the license management computer.

FIG. 4 is a functional block diagram showing, by way of example, the functions of the CPU included in the license management computer. Referring to FIG. 4, CPU 101 included in license management computer 100 includes: an installation request receiving portion 151 which receives an installation request from installation computer 200; an installation-time extracting portion 153 which extracts management information stored in advance in HDD 107, on the basis of the received installation request; an installation management portion 155 which determines whether to permit installation, on the basis of the management information extracted by installation-time extracting portion 153; an installation-time comparing portion 159, an installation-time updating portion 161 which updates the management information stored in HDD 107; a management information generating portion 157 which newly generates management information if the management information is not extracted; an execution request receiving portion 171 which receives an execution request from installation computer 200; an execution-time extracting portion 173 which extracts the management information stored in HDD 107, on the basis of the received execution request; an execution management portion 175 which determines whether to permit execution of an application, on the basis of the management information extracted by execution-time extracting portion 173; an execution-time comparing portion 177; and an execution-time updating portion 179 which updates the management information stored in HDD 107.

Installation request receiving portion 151 controls communication I/F 111 to receive an installation request from installation computer 200, and outputs the received request to installation-time extracting portion 153. Installation computer 200 issues the installation request, which will be described later in detail, when installing an application program. The installation request includes: program identification information for identifying the authentication program to be installed into installation computer 200, device identification information for identifying installation computer 200, and external device identification information for specifying an external device connected to installation computer 200 via network 3.

Installation-time extracting portion 153 extracts, from the management information stored in HDD 107, the management information that includes the same program identification information as the one included in the installation request received from installation request receiving portion 151. The management information is generated by management information generating portion 157, as will be described later, and stored in HDD 107. In the case where installation-time extracting portion 153 has succeeded in extracting from HDD 107 the management information including the same program identification information as the one included in the installation request, installation-time extracting portion 153 outputs the extracted management information to installation-time comparing portion 159. If the management information including the same program identification information as the one included in the installation request is not stored in HDD 107, installation-time extracting portion 153 cannot extract the management information. In this case, installation-time extracting portion 153 outputs to management information generating portion 157 an instruction to generate management information including the installation request.

Further, in the case where installation-time extracting portion 153 has extracted the management information including the same program identification information as the one included in the installation request from HDD 107, installation-time extracting portion 153 outputs to installation management portion 155 a signal indicating that there is the management information. If the management information is not stored in HDD 107 and thus cannot be extracted, installation-time extracting portion 153 outputs to installation management portion 155 a signal indicating that there is no such management information.

When receiving the instruction to generate the management information from installation-time extracting portion 153, management information generating portion 157 generates new management information which includes the program identification information, the device identification information, and the external device identification information included in the installation request, and stores the generated management information in HDD 107. The management information will now be described.

FIG. 5 shows an example of the format of the management information. Referring to FIG. 5, the management information includes the fields of "program identification information", "device identification information", and "external device identification information". In the "program identification information" field, the program identification information for identifying an application program is set. In the "device identification information" field, the device identification information for identifying the device into which the program specified by the program identification information is installed is set. Here, as the device identification information, an IP address assigned to the device is used. In the "external device identification information" field, information for specifying any external device that is connected via network 3 to the device into which the application program specified by the program identification information is installed is set. The external device identification information will be described later in detail. For example in the case where the device into which the program specified by the program identification information is installed is installation computer 200, MFPs 301 to 305 and license management computer 100 may be the external devices that are connected to installation computer 200 via network 3, and the IP addresses assigned thereto may be used as the external device identification information.

Returning to FIG. 4, installation-time comparing portion 159 compares the installation request input from installation-time extracting portion 153 with the management information. Specifically, it compares the device identification information included in the installation request with the device identification information set in the "device identification information" field in the management information. Further, installation-time comparing portion 159 compares the external device identification information included in the installation request with the external device identification information set in the "external device identification information" field in the management information. Installation-time comparing portion 159 outputs a result of comparison to installation management portion 155 and installation-time updating portion 161. Here, the result of the comparison made by installation-time comparing portion 159 is referred to as the "installation-time comparison result".

There are four types of such results: first through fourth installation-time comparison results. The first installation-time comparison result corresponds to the case where the device identification information included in the installation request coincides with the device identification information in the management information and the external device identification information included in the installation request also coincides with the external device identification information in the management information. The second installation-time comparison result corresponds to the case where the device identification information included in the installation request coincides with the device identification information in the management information and the external device identification information included in the installation request differs from the external device identification information in the management information. The third installation-time comparison result corresponds to the case where the device identification information included in the installation request differs from the device identification information in the management information and the external device identification information included in the installation request coincides with the external device identification information in the management information. The fourth installation-time comparison result corresponds to the case where the device identification information included in the installation request differs from the device identification information in the management information and the external device identification information included in the installation request also differs from the external device identification information in the management information.

It is noted that, in the case where there are two or more pieces of external device identification information, it may be determined that the external device identification information included in the installation request coincides with the external device identification information in the management information, not only when all the pieces of external device identification information included in the installation request coincide with the corresponding pieces of external device identification information set in the "external device identification information" field in the management information, but also when some of them coincide with the corresponding ones. For example, assume that MFPs 301 to 305 are set as the devices to be managed when installation computer 200 installs an authentication program. In this case, the IP addresses of the respective MFPs 301 to 305 are set in the management information as the external device identification information. Then, assume that a new MFP is added as a device to be managed, and the authentication program is re-installed into installation computer 200. Installation computer 200 transmits to license management computer 100 an installation request with the IP address of the new MFP added as the external device identification information. In this case, while the IP addresses of MFPs 301 to 305 among the external device identification information included in the installation request coincide with the corresponding pieces of the external device identification information included in the management information, the IP address of the new MFP which is included in the installation request is not included in the management information. In such a case where there are two or more pieces of external device identification information, it may be determined that the external device identification information included in the installation request coincides with the external device identification information in the management information if some of the plurality of pieces of external device identification information included in the installation request coincide with the corresponding ones of the external device identification information set in the "external device identification information" field in the management information.

The case where the result of the comparison by installation-time comparing portion 159 becomes the first installation-time comparison result corresponds to the case where the authentication program is re-installed into installation computer 200 after it has been installed into installation computer 200, which is a legal installation. The case where the result of the comparison by installation-time comparing portion 159 becomes the second installation-time comparison result corresponds to the case where the external device identification information is changed after the authentication program has been installed and the authentication program is re-installed, which is a legal installation. The case where the result of the comparison by installation-time comparing portion 159 becomes the third installation-time comparison result corresponds to the case where, after the authentication program has been installed into a computer other than installation computer 200, external device identification information which is the same as the one that specifies the external device connected to the other computer via the network is provided to installation computer 200 and the authentication program is installed into installation computer 200, which is a legal installation. The case where the result of the comparison by installation-time comparing portion 159 becomes the fourth installation-time comparison result corresponds to the case where, after the authentication program is installed into a computer other than installation computer 200, external device identification information which is different from the one related to the other computer is provided to installation computer 200 and the authentication program is installed into installation computer 200, which is an illegal installation.

Installation-time updating portion 161 updates the management information extracted by installation-time extracting portion 153 from among the management information stored in HDD 107, on the basis of the installation-time comparison result received from installation-time comparing portion 159. Specifically, in the case where the first, third, or fourth installation-time comparison result is received from installation-time comparing portion 159, installation-time updating portion 161 does not update the management information stored in HDD 107. In the case where the second installation-time comparison result is received, installation-time updating portion 161 updates the external device identification information set in the "external device identification information" field in the management information with the external device identification information included in the installation request.

In the case where the signal indicating that there is no relevant management information is input from installation-time extracting portion 153, installation management portion 155 permits installation of the authentication program to installation computer 200 that has issued the installation request.

In the case where the signal indicating that the management information has been extracted is input from installation-time extracting portion 153, installation management portion 155 determines whether to permit installation of the authentication program to installation computer 200, on the basis of the comparison result received from installation-time comparing portion 159. Specifically, if the first, second, or third installation-time comparison result is input, installation management portion 155 permits installation of the authentication program to installation computer 200. If the fourth installation-time comparison result is input, installation management portion 155 does not permit installation of the authentication program to installation computer 200.

In the case of permitting installation of the authentication program to installation computer 200, installation management portion 155 transmits an installation enabling signal permitting the installation of the authentication program to installation computer 200 via the communication I/F. In the case of not permitting installation of the authentication program to installation computer 200, installation management portion 155 transmits an installation disabling signal not permitting the installation of the authentication program to installation computer 200 via the communication I/F.

Execution request receiving portion 171 controls communication I/F 111 to receive an execution request from installation computer 200, and outputs the execution request to execution-time extracting portion 173. The execution request transmitted from installation computer 200 to license management computer 100 will be described later in detail. Installation computer 200 transmits the execution request to license management computer 100 when starting the installed authentication program which has not been executed yet, or when the external device identification information is changed after the installed authentication program has been executed. The execution request includes program identification information for identifying the authentication program that has been installed in installation computer 200, device identification information for identifying installation computer 200, and external device identification information related to installation computer 200.

Execution-time extracting portion 173 extracts, from the management information stored in HDD 107, the management information including the same program identification information as the one included in the execution request received from execution request receiving portion 171. If execution-time extracting portion 173 has succeeded in extracting from HDD 107 the management information including the same program identification information as the one included in the execution request, execution-time extracting portion 173 outputs the extracted management information to execution management portion 175. On the other hand, if the management information including the same program identification information as the one included in the execution request is not stored in HDD 107, execution-time extracting portion 173 cannot extract the management information. If execution-time extracting portion 173 has succeeded in extracting the management information including the same program identification information as the one included in the execution request from HDD 107, it outputs to execution management portion 175 a signal indicating that there is the relevant management information. On the other hand, if the management information including the same program identification information as the one included in the execution request is not stored in HDD 107 and thus execution-time extracting portion 173 cannot extract the management information, then execution-time extracting portion 173 outputs to execution management portion 175 a signal indicating that there is no such management information.

Execution-time comparing portion 177 compares the execution request input from execution-time extracting portion 173 with the management information. Specifically, it compares the device identification information included in the execution request with the device identification information set in the "device identification information" field in the management information. Further, execution-time comparing portion 177 compares the external device identification information included in the execution request with the external device identification information set in the "external device identification information" field in the management information. Execution-time comparing portion 177 outputs a result of comparison to execution management portion 175 and execution-time updating portion 179. Here, the result of the comparison made by execution-time comparing portion 177 is referred to as the "execution-time comparison result".

There are four types of such results of: first through fourth execution-time comparison results. The first execution-time comparison result corresponds to the case where the device identification information included in the execution request coincides with the device identification information in the management information and the external device identification information included in the execution request also coincides with the external device identification information in the management information. The second execution-time comparison result corresponds to the case where the device identification information included in the execution request coincides with the device identification information in the management information and the external device identification information included in the execution request differs from the external device identification information in the management information. The third execution-time comparison result corresponds to the case where the device identification information included in the execution request differs from the device identification information in the management information and the external device identification information included in the execution request coincides with the external device identification information in the management information. The fourth execution-time comparison result corresponds to the case where the device identification information included in the execution request differs from the device identification information in the management information and the external device identification information included in the execution request also differs from the external device identification information in the management information.

The case where the result of the comparison by execution-time comparing portion 177 becomes the first execution-time comparison result corresponds to the case where the authentication program is executed in installation computer 200 after the authentication program has been installed into installation computer 200, which is a legal execution of the authentication program. The case where the result of the comparison by execution-time comparing portion 177 becomes the second execution-time comparison result corresponds to the case where the external device identification information is changed after the authentication program has been installed, and then the authentication program is executed, which is a legal execution of the authentication program. The case where the result of the comparison by execution-time comparing portion 177 becomes the third execution-time comparison result corresponds to the case where, after the authentication program has been legitimately installed into a computer other than installation computer 200, external device identification information which is the same as the one related to the other computer is provided to installation computer 200 and the authentication program is installed into and executed by installation computer 200, which is an illegal execution of the authentication program. The case where the result of the comparison by execution-time comparing portion 177 becomes the fourth execution-time comparison result corresponds to the case where, after the authentication program has been installed into a computer other than installation computer 200, external device identification information different from the one related to the other computer is provided to installation computer 200 and the authentication program is installed into and executed by installation computer 200, which is an illegal execution of the authentication program.

Execution-time updating portion 179 updates the management information extracted by execution-time extracting portion 173 from among the management information stored in HDD 107, on the basis of the comparison result received from execution-time comparing portion 177. Specifically, in the case where the second execution-time comparison result is input, execution-time updating portion 179 updates the external device identification information set in the "external device identification information" field in the management information with the external device identification information included in the execution request. In the case where the first, third, or fourth execution-time comparison result is input from execution-time comparing portion 177, execution-time updating portion 179 does not update the management information stored in HDD 107. This is because in the case where the first execution-time comparison result is input, the execution of the authentication program is legal and there is no change in the external device identification information, whereas in the case where the third or fourth execution-time comparison result is input, the execution of the authentication program is illegal.

In the case where the signal indicating that the relevant management information does not exist is input from execution-time extracting portion 173, execution management portion 175 does not permit execution of the authentication program to installation computer 200 that issued the execution request. This is because, if the authentication program has been installed legally, the management information including the program identification information for identifying the authentication program should be generated by management information generating portion 157 and stored in HDD 107. That the management information is not stored means that the authentication program illegally installed is about to be executed.

Further, in the case where the signal indicating that the management information has been extracted is input from execution-time extracting portion 173, execution management portion 175 determines whether to permit execution of the authentication program to installation computer 200, on the basis of the comparison result input from execution-time comparing portion 177. Specifically, in the case where either the first or second execution-time comparison result is input, execution management portion 175 permits execution of the authentication program to installation computer 200, whereas in the case where either the third or fourth execution-time comparison result is input, execution management portion 175 does not permit execution of the authentication program to installation computer 200.

In the case of permitting execution of the authentication program to installation computer 200, execution management portion 175 transmits an execution enabling signal permitting execution of the authentication program to installation computer 200 via the communication I/F. In the case of not permitting execution of the authentication program to installation computer 200, execution management portion 175 transmits an execution disabling signal not permitting execution of the authentication program to installation computer 200 via the communication I/F.

Figure 6:
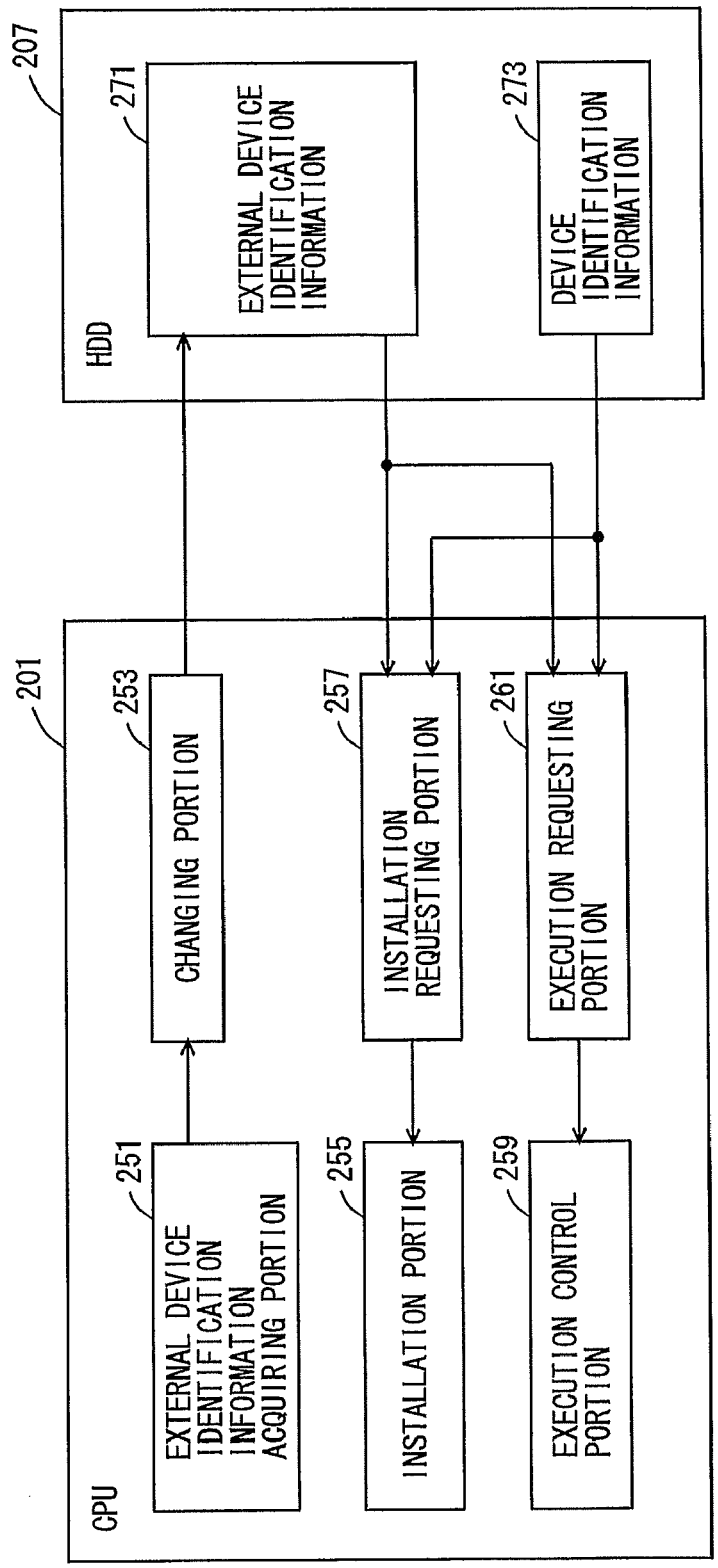
FIG. 6 is a functional block diagram showing, by way of example, the functions of a CPU included in the installation computer, together with information stored in an HDD.

FIG. 6 is a functional block diagram showing, by way of example, the functions of the CPU included in the installation computer, together with information stored in the HDD. Referring to FIG. 6, CPU 201 included in installation computer 200 includes: an external device identification information acquiring portion 251 which acquires external device identification information; a changing portion 253 which changes external device identification information 271 stored in HDD 207; an installation requesting portion 257 which requests an installation permission from license management computer 100 when installing an authentication program; an installation portion 255 which installs the authentication program; an execution requesting portion 261 which requests an execution permission from license management computer 100 when executing the authentication program; and an execution control portion 259 which executes the authentication program.

When a user inputs into installation computer 200 an operation to instruct installation of the authentication program, external device identification information acquiring portion 251 acquires external device identification information. The external device identification information refers to device identification information (managed-device identification information) for identifying a device to be managed by installation computer 200 when the authentication program is executed. Specifically, external device identification information acquiring portion 251 displays, on display portion 217, a list of device names for identifying the devices which are connected to network 3 and communicable with installation computer 200. Here, the device names assigned to MFPs 301 to 305 are displayed as a list. It is noted that the names of installation computer 200 and license management computer 100 are not included in the list, because they execute the license management process.

When the user operates input portion 215 to select any of the device names displayed in the list, external device identification information acquiring portion 251 accepts the selected one as the device to be managed, or the managed device. The managed device is not restricted thereto; it may be a gateway, router, hub or the like, as long as it is the external device connected to installation computer 200 via network 3. External device identification information acquiring portion 251 outputs to changing portion 253 the device identification information (managed-device identification information) for identifying the MFP corresponding to the device name accepted as the device to be managed, as the external device identification information. While an IP address is used here as the device identification information, the device identification information may be, in place of the IP address, any information that can identify each of MFPs 301 to 305, which may be a device name, a media access control (MAC) address, or a serial number assigned to the device.

Changing portion 253 stores in HDD 207 the external device identification information input from external device identification information acquiring portion 251. In this manner, external device identification information 271 is stored in HDD 207.

FIG. 7 shows an example of the format of the external device identification information. Referring to FIG. 7, the external device identification information includes the fields of "managed device 1" to "managed device N" in each of which the device identification information for identifying the device to be managed is set. It is noted that "N" is a positive integer, and N=5 here. As MFPs 301 to 305 are selected by the user as the devices to be managed, the IP addresses of MFPs 301 to 305 are set in the "managed device 1" field through the "managed device 5" field, respectively.

Returning to FIG. 6, in the case where external device identification information 271 has already been stored in HDD 207, changing portion 253 changes external device identification information 271 stored in HDD 207 with the external device identification information acquired from external device identification information acquiring portion 251. There are cases where external device identification information 271 is changed, added, or deleted. It may be configured such that the user instructs external device identification information acquiring portion 251 to add, change, or delete the information, and external device identification information 271 stored in HDD 207 may be added, changed, or deleted in accordance with the instruction from the user.

When a new piece of external device identification information 271 is stored in HDD 207 by changing portion 253, installation requesting portion 257 transmits an installation request to license management computer 100. The installation request includes: program identification information for identifying the authentication program, device identification information for identifying installation computer 200 into which the authentication program is installed, and external device identification information 271 stored in HDD 207. When license management computer 100 receives the installation request, it transmits an installation enabling signal to installation computer 200 in the case of permitting installation of the authentication program, while it transmits an installation disabling signal to installation computer 200 in the case of not permitting the installation of the authentication program, as described above. When installation requesting portion 257 receives the installation enabling signal or the installation disabling signal from license management computer 100, installation requesting portion 257 outputs the received signal to installation portion 255.

In the case where the installation enabling signal is received from installation requesting portion 257, installation portion 255 installs the authentication program. If the installation disabling signal is received from installation requesting portion 257, installation portion 255 displays an error message on display portion 217.

When the authentication program is installed by installation portion 255, CPU 201 is able to execute the authentication program. When the user inputs into input portion 215 an operation to instruct execution of the installed authentication program, or when external device identification information 271 stored in HDD 207 is changed by changing portion 253, execution requesting portion 261 transmits an execution request to license management computer 100. The execution request includes: program identification information for identifying the authentication program, device identification information for identifying installation computer 200 into which the authentication program is installed, and external device identification information 271 stored in HDD 207. When receiving the execution request, license management computer 100 transmits an execution enabling signal to installation computer 200 in the case of permitting execution of the authentication program, whereas it transmits an execution disabling signal to installation computer 200 in the case of not permitting execution of the authentication program, as described above. When communication I/F 211 receives the execution enabling signal or the execution disabling signal from license management computer 100, execution requesting portion 261 outputs the signal received by communication I/F 211, to execution control portion 259.

When receiving the execution enabling signal from execution requesting portion 261, execution control portion 259 executes the authentication program. When receiving the execution disabling signal from execution requesting portion 261, execution control portion 259 displays an error message on display portion 217, not executing the authentication program.

Figure 8:
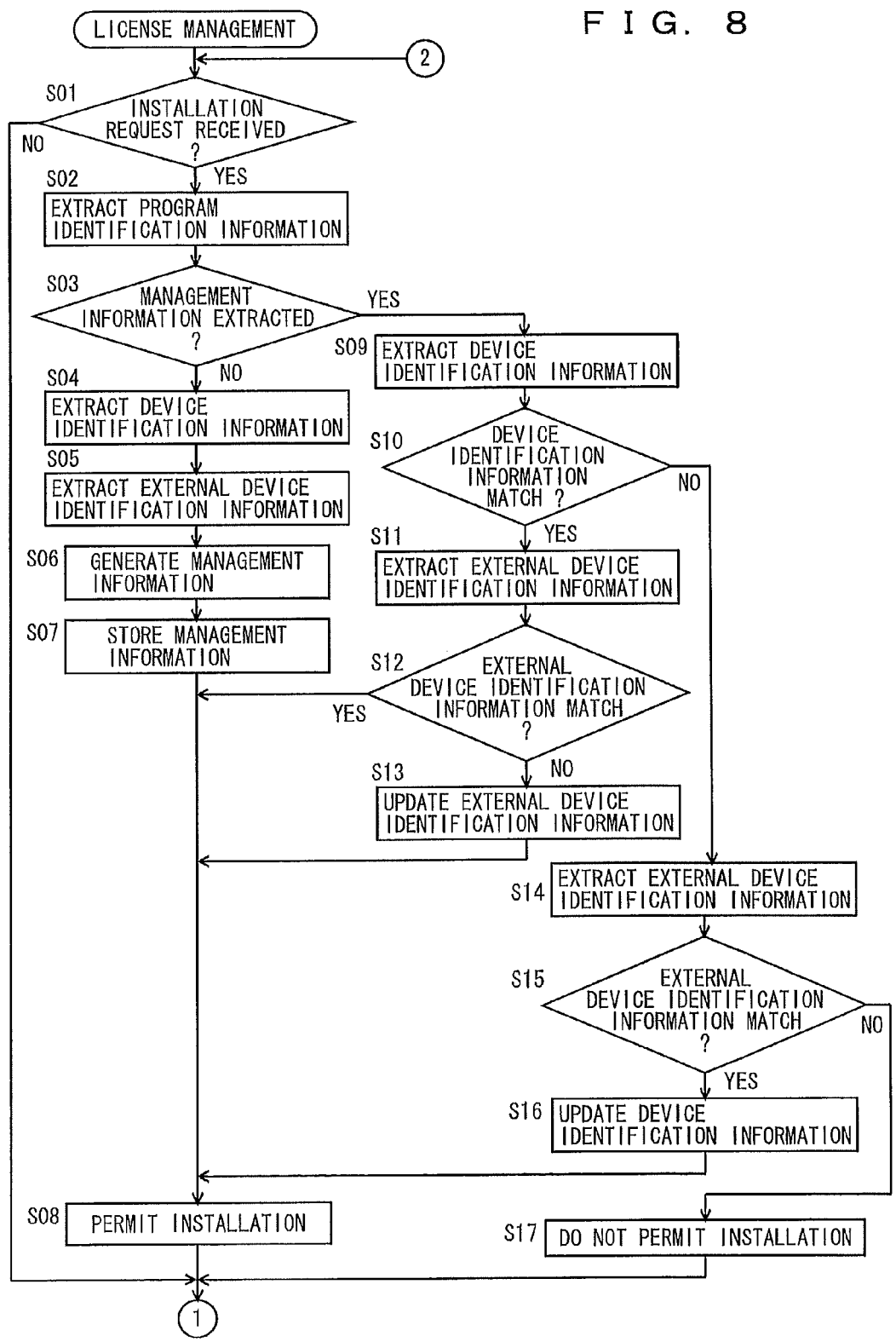
FIGS. 8 and 9 constitute a flowchart illustrating an example of the flow of a license management process.
Figure 9:
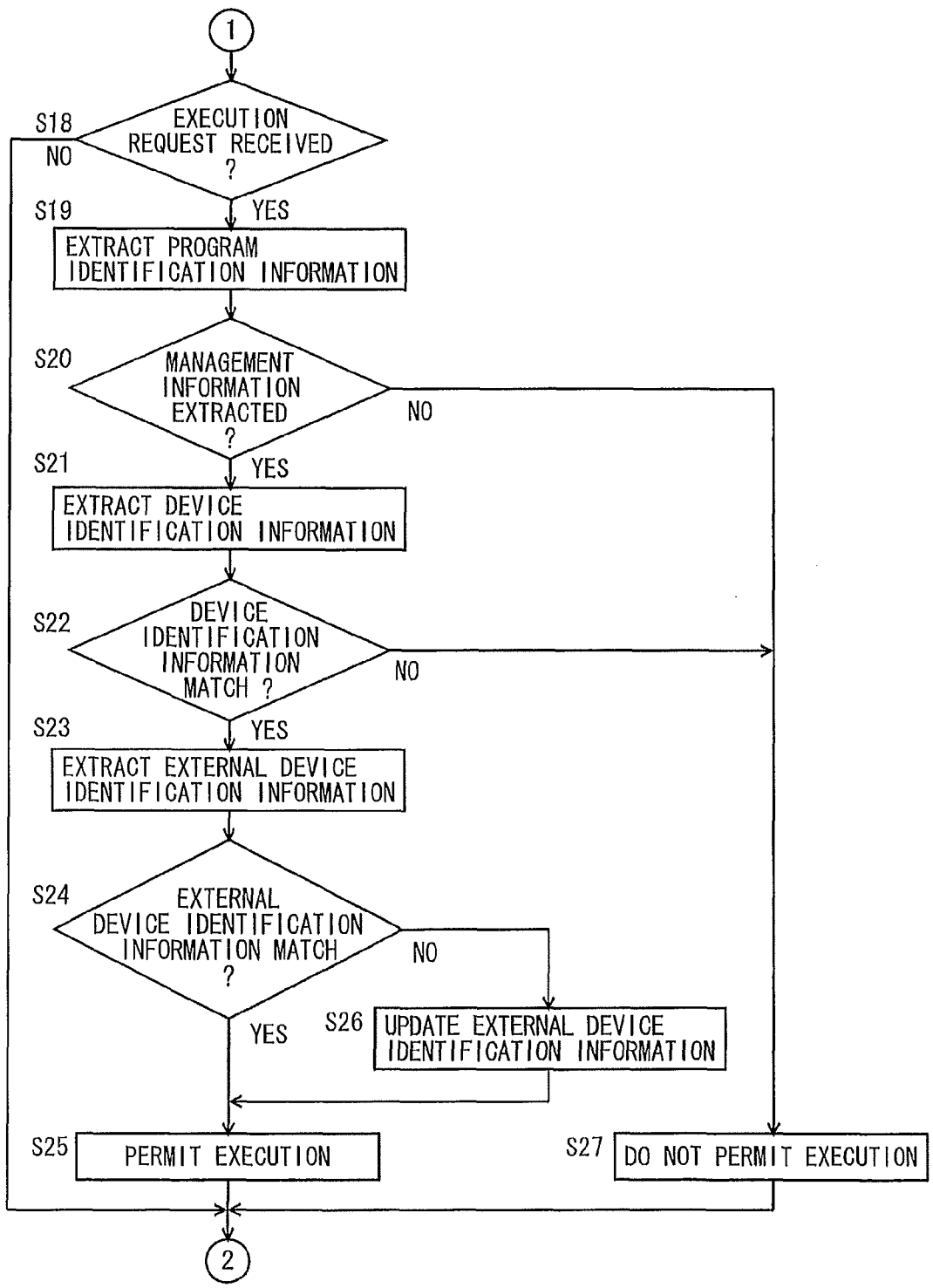

FIGS. 8 and 9 constitute a flowchart illustrating an example of the flow of a license management process. The license management process is carried out by CPU 101 included in license management computer 100 as CPU 101 executes a license management program.

Referring to FIGS. 8 and 9, CPU 101 determines whether an installation request has been received (step S01). The determination is made according to whether communication I/F 111 has received an installation request from installation computer 200. If communication I/F 111 has received the installation request, the process proceeds to step S02; otherwise, the process proceeds to step S18.

In step S02, program identification information is extracted from the installation request. Then, the management information including the extracted program identification information is extracted from among the management information stored in HDD 107 (step S03). Specifically, of the management information stored in HDD 107, the management information in which the same program identification information as the one extracted from the installation request is set in the "program identification information" field is extracted. If the management information in which the same program identification information as the one extracted from the installation request is set in the "program identification information" field is extracted, the process proceeds to step S09; otherwise, the process proceeds to step S04.

Next, device identification information is extracted (step S04) and external device identification information is also extracted (step S05) from the installation request received in step S01. In the following step S06, management information including the program identification information extracted in step S02, the device identification information extracted in step S04, and the external device identification information extracted in step S05 is generated. The generated management information is stored in HDD 107 (step S07), and the process proceeds to step S08. In step S08, installation is permitted, and the process proceeds to step S18. In the case of permitting installation, an installation enabling signal is transmitted via communication I/F 111 to installation computer 200 which issued the installation request.

On the other hand, in step S09, device identification information is extracted from the installation request received in step S01. It is then determined whether the extracted device identification information coincides with the device identification information included in the management information extracted in step S03 (step S10). Specifically, the extracted device identification information is compared with the device identification information set in the "device identification information" field in the management information extracted in step S03, to determine whether they match each other. If the extracted device identification information coincides with the device identification information included in the management information extracted in step S03, the process proceeds to step S11; otherwise, the process proceeds to step S14.

In step S11, external device identification information is extracted from the installation request received in step S01. It is then determined whether the extracted external device identification information coincides with the external device identification information included in the management information extracted in step S03 (step S12). Specifically, the extracted external device identification information is compared with the external device identification information set in the "external device identification information" field in the management information extracted in step S03 to determine whether they match each other. If the extracted external device identification information and the external device identification information included in the management information extracted in step S03 do not match, the process proceeds to step S13; while if they match, the process proceeds to step S08, with step S13 being skipped. In step S13, the management information stored in HDD 107 is updated with the external device identification information extracted from the installation request in step S11, and the process proceeds to step S08. Specifically, the external device identification information set in the "external device identification information" field in the management information stored in HDD 107 is updated with the external device identification information extracted from the installation request. In step S08, installation is permitted, and the process proceeds to step S18.

In step S14, external device identification information is extracted from the installation request received in step S01. It is then determined whether the extracted external device identification information coincides with the external device identification information included in the management information extracted in step S03 (step S15). If the extracted external device identification information and the external device identification information included in the management information extracted in step S03 match, the process proceeds to step S16; otherwise, the process proceeds to step S17. In step S16, the management information stored in HDD 107 is updated with the device identification information extracted from the installation request in step S09, and the process proceeds to step S08. Specifically, the device identification information set in the "device identification information" field in the management information stored in HDD 107 is updated with the device identification information extracted from the installation request. In step S08, installation is permitted, and the process proceeds to step S18.

In step S17, installation is not permitted, and the process proceeds to step S18. In the case of not permitting the installation, an installation disabling signal is transmitted via communication I/F 111 to installation computer 200 which issued the installation request.

In step S18, it is determined whether an execution request has been received. The determination is made according to whether communication I/F 111 has received an execution request from installation computer 200. If communication I/F 111 has received the execution request, the process proceeds to step S19; otherwise, the process returns to step S01. In step S19, program identification information is extracted from the execution request. Then, the management information including the extracted program identification information is extracted from among the management information stored in HDD 107 (step S20). Specifically, of the management information stored in HDD 107, the management information in which the same program identification information as the one extracted from the execution request is set in the "program identification information" field is extracted. If the management information in which the same program identification information as the one extracted from the execution request is set in the "program identification information" field has been extracted, the process proceeds to step S21; otherwise, the process proceeds to step S27.

In step S21, device identification information is extracted from the execution request received in step S18. It is then determined whether the extracted device identification information coincides with the device identification information included in the management information extracted in step S20 (step S22). Specifically, the extracted device identification information is compared with the device identification information set in the "device identification information" field in the management information extracted in step S20, to determine whether they match each other. If the extracted device identification information coincides with the device identification information included in the management information extracted in step S20, the process proceeds to step S23; otherwise, the process proceeds to step S27.

In step S23, external device identification information is extracted from the execution request received in step S18. It is then determined whether the extracted external device identification information coincides with the external device identification information included in the management information extracted in step S20 (step S24). Specifically, the extracted external device identification information is compared with the external device identification information set in the "external device identification information" field in the management information extracted in step S20, to determine whether they match each other. If the extracted external device identification information and the external device identification information included in the management information extracted in step S20 do not match, the process proceeds to step S26; while if they match, the process proceeds to step S25, with step S26 being skipped. In step S26, the management information stored in HDD 107 is updated with the external device identification information extracted from the execution request in step S23. The process then proceeds to step S25. Specifically, the external device identification information set in the "external device identification information" field in the management information stored in HDD 107 is updated with the external device identification information extracted from the execution request. In step S25, execution of the authentication program is permitted, and the process returns to step S01. In the case of permitting execution of the authentication program, an execution enabling signal is transmitted via communication I/F 111 to installation computer 200 which issued the execution request.

On the other hand, in step S27, execution of the authentication program is not permitted, and the process returns to step S01. In the case of not permitting execution of the authentication program, an execution disabling signal is transmitted via communication I/F 111 to installation computer 200 which issued the execution request.

FIG. 10 is a flowchart illustrating an example of the flow of an installation process. The installation process is carried out by CPU 201 included in installation computer 200 as CPU 201 executes the license management program. Referring to FIG. 10, CPU 201 determines whether an installation instruction has been accepted (step S51). When the user inputs into input portion 215 an operation to instruct installation of the authentication program, the installation instruction is accepted. CPU 201 is in a standby mode until the installation instruction is accepted (NO in step S51), and once the installation instruction is accepted, the process proceeds to step S52. In other words, the installation process is carried out on the condition that the installation instruction is input from the user.

The installation instruction is an instruction to install the authentication program. In step S52, program identification information is acquired. Specifically, the program identification information for identifying the authentication program of which installation has been instructed in step S51 is acquired. Then, device identification information for identifying the own device is acquired (step S53). Here, as the device identification information for identifying installation computer 200, the IP address assigned to installation computer 200 is acquired. Further, external device identification information is acquired (step S54). Here, the external device identification information corresponds to the device identification information for identifying the device to be managed by installation computer 200 in which the authentication program is executed. To this end, installation computer 200 displays on display portion 217 a list of device names for identifying the devices connected to network 3 and communicable with installation computer 200, and when the user operates input portion 215 to select any of the device names from the list being displayed, installation computer 200 accepts the selected one as the device to be managed, and acquires the device identification information for identifying the device of that device name as the external device identification information. Here, it is assumed that MFPs 301 to 305 are selected as the devices to be managed, and the IP addresses of MFPs 301 to 305 are acquired as the device identification information for identifying MFPs 301 to 305.

In step S55, an installation request is transmitted to license management computer 100. Specifically, an installation request including the program identification information acquired in step S52, the device identification information acquired in step S53, and the external device identification information acquired in step S54 is generated, and the generated installation request is transmitted via communication I/F 211 to license management computer 100.

In the following step S56, it is determined whether installation has been permitted. Specifically, it is determined that installation is permitted in the case where communication I/F 211 receives a license enabling signal from license management computer 100, whereas it is determined that installation is not permitted in the case where communication I/F 211 receives a license disabling signal from license management computer 100. If installation is permitted, the process proceeds to step S57; otherwise, the process proceeds to step S58.

In step S57, the authentication program of which installation has been instructed in step S51 is installed, and the process is finished. On the other hand, in step S58, an error message is displayed on display portion 217, and the process is finished. The error message is a message indicating, for example, installation of the authentication program is illegal.

Figure 11:
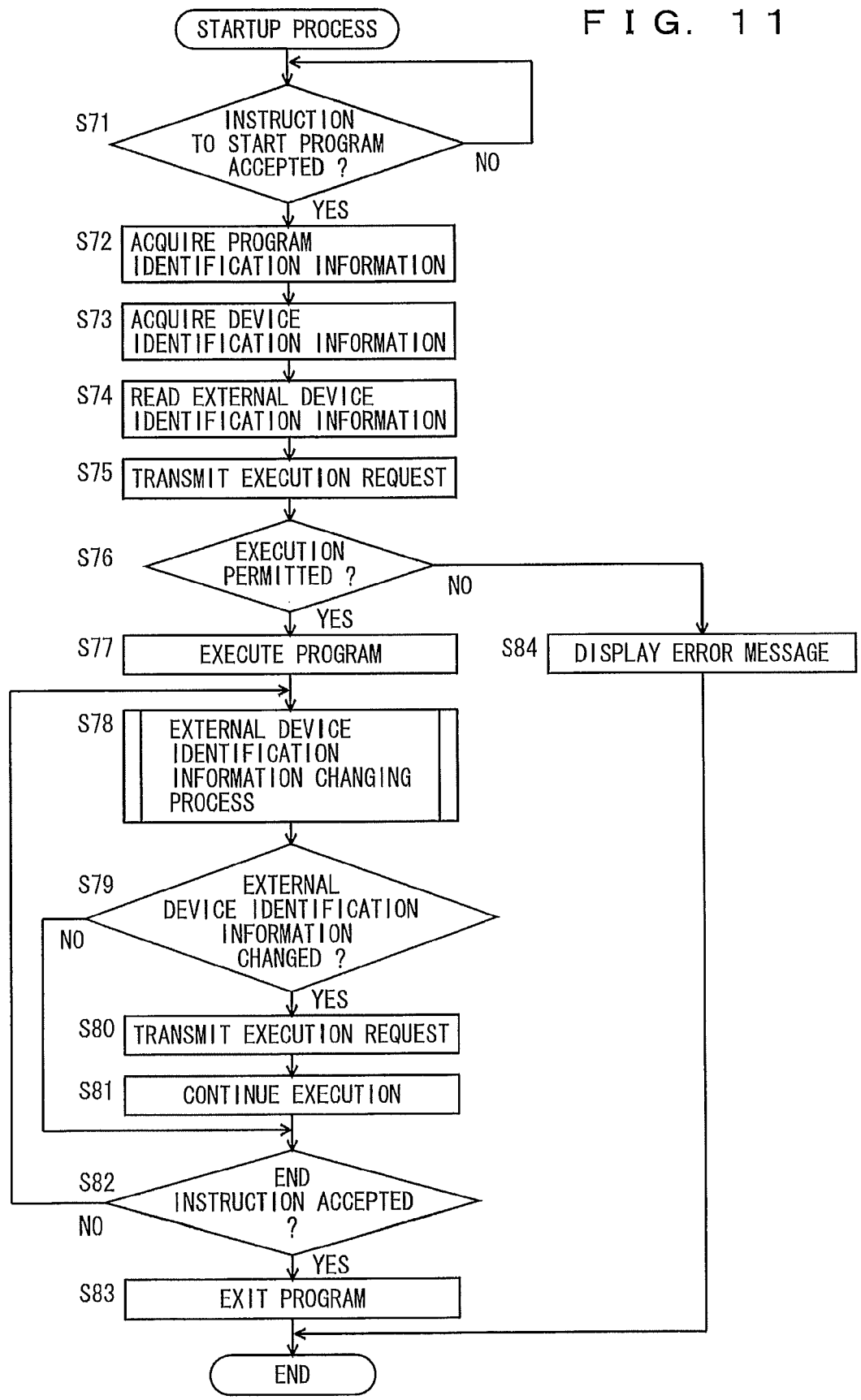
FIG. 11 is a flowchart illustrating an example of the flow of a startup process.

FIG. 11 is a flowchart illustrating an example of the flow of a startup process. The startup process is carried out by CPU 201 included in installation computer 200 as CPU 201 executes the license management program. Referring to FIG. 11, CPU 201 determines whether an instruction to start an application program has been accepted. CPU 201 is in a standby mode until an instruction to start the application program is accepted (NO in step S71), and once the instruction to start the application program is accepted (YES in step S71), the process proceeds to step S72. Here, it is assumed that startup of an authentication program has been instructed.

In step S72, program identification information for identifying the authentication program of which startup has been instructed is acquired.

In step S73, device identification information for identifying the own device is acquired. Here, as the device identification information for identifying installation computer 200, the IP address assigned to installation computer 200 is acquired. Further, external device identification information 271 stored in HDD 207 is read (step S74).

In step S75, an execution request is transmitted to license management computer 100. Specifically, an execution request including the program identification information acquired in step S'2, the device identification information acquired in step S73, and the external device identification information read from HDD 207 in step S74 is generated, and the generated execution request is transmitted via communication I/F 211 to license management computer 100.

In the following step S76, it is determined whether execution has been permitted. Specifically, if communication I/F 211 receives an execution enabling signal from license management computer 100, it is determined that execution of the authentication program is permitted. If an execution disabling signal is received from license management computer 100, it is determined that execution of the authentication program is not permitted. If execution of the authentication program is permitted, the process proceeds to step S77; otherwise, the process proceeds to step S84. In step S77, the authentication program is executed, and the process proceeds to step S78.

In step S78, an external device identification information changing process is carried out, and the process proceeds to step S79. The external device identification information changing process, which will be described later in detail, is the process of changing external device identification information 271 stored in HDD 207. In step S79, it is determined whether external device identification information 271 stored in HDD 207 has been changed. If external device identification information 271 has been changed, the process proceeds to step S80; otherwise, the process proceeds to step S82. In step S80, an execution request is transmitted. The execution request transmitted here differs from the execution request transmitted in step S75 in that it includes the external device identification information changed in step S78. License management computer 100, which has permitted installation of the authentication program to installation computer 200, receives the execution request from installation computer 200 when the external device identification information is changed in installation computer 200. This allows license management computer 100 to update the management information on the basis of the external device identification information changed in installation computer 200. It is noted that installation computer 200, in response to transmission of the execution request to license management computer 100, receives a signal enabling or disabling execution of the program from license management computer 100. Here, the execution enabling signal permitting execution of the program is exclusively received, and therefore, the process proceeds to step S81.

In step S81, execution of the authentication program is continued, and the process proceeds to step S82. In step S82, it is determined whether an instruction to exit the authentication program has been accepted. If the end instruction has been accepted, the process proceeds to step S83; otherwise, the process returns to step S78. In step S83, the authentication program is exited, and the process is finished.

On the other hand, in step S84, an error message is displayed, and the process is finished. The error message is a message indicating, e.g., the authentication program has been installed illegally.

Figure 12:
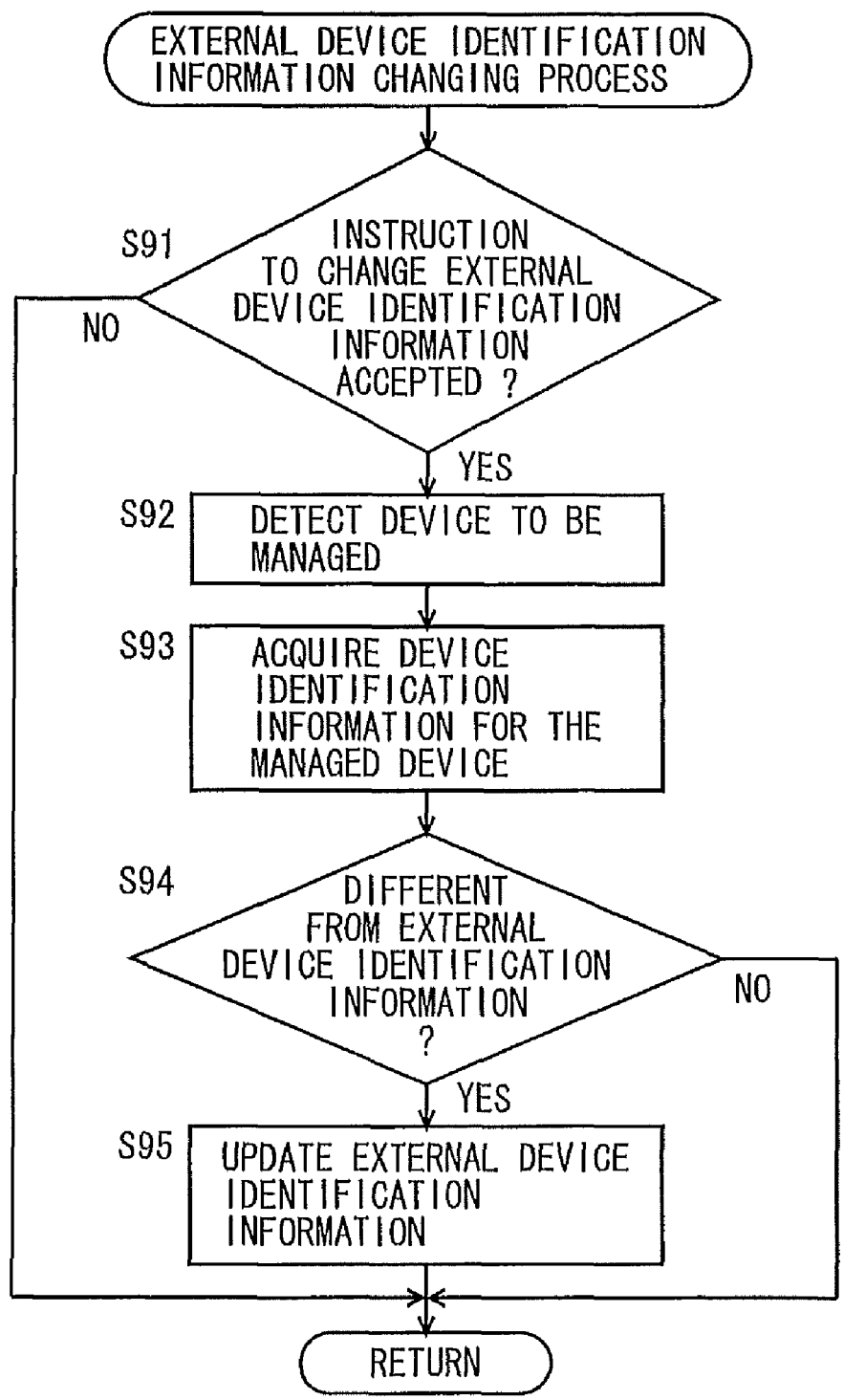
FIG. 12 is a flowchart illustrating an example of the flow of an external device identification information changing process.

FIG. 12 is a flowchart illustrating an example of the flow of the external device identification information changing process. The external device identification information changing process is carried out in step S78 in FIG. 11. Referring to FIG. 12, it is determined whether an instruction to change the external device identification information has been accepted (step S91). When the user inputs into input portion 215 an instruction to change the external device identification information, the instruction to change the external device identification information is accepted. If the instruction to change the external device identification information is accepted, the process proceeds to step S92; otherwise, the process returns to the startup process.

In step S92, the device identification information for the managed device is detected. Specifically, any external device connected to network 3 and communicable with installation computer 200 is detected, and the device names for identifying the detected devices are displayed as a list on display portion 217. When the user operates input portion 215 to select any of the device names displayed in the list, the selected one is detected as the managed device. The device identification information for identifying the device detected as the managed device is acquired as the external device identification information (step S93).

In step S94, it is determined whether the device identification information acquired in step S93 differs from external device identification information 271 stored in HDD 207. If the device identification information acquired in step S93 differs from external device identification information 271 stored in HDD 207, the process proceeds to step S95; otherwise, the process returns to the startup process, with step S95 being skipped. In step S95, external device identification information 271 stored in HDD 207 is updated with the device identification information acquired in step S93, and the process returns to the startup process.

As described above, according to license management system 1 of the present embodiment, license management computer 100 stores in HDD 107 the management information which includes the program identification information for identifying the authentication program, the IP address for identifying the computer into which the authentication program is installed, and the IP address for identifying the device to be managed by the computer into which the authentication program is installed. When installation computer 200 that is about to install the authentication program transmits to license management computer 100 an installation request including the program identification information for identifying the authentication program, the IP address of installation computer 200, and the device identification information (external device identification information) for MFPs 301 to 305 which are to be managed by installation computer 200, license management computer 100 receives the installation request. License management computer 100 searches the HDD for the management information including the same program identification information as the one included in the received installation request. If such management information is not extracted, license management computer 100 generates new management information including the program identification information, the device identification information, and the external device identification information included in the received installation request, and stores the generated management information in the HDD, and at the same time, it permits installation of the authentication program to installation computer 200. If the management information including the same program identification information as the one included in the received installation request is extracted, license management computer 100 compares the device identification information and the external device identification information included in the received installation request respectively with the device identification information and the external device identification information included in the extracted management information, and if at least one of the device identification information and the external device identification information included in the received installation request matches the corresponding one of the device identification information and the external device identification information included in the extracted management information, license management computer 100 permits installation of the authentication program to installation computer 200. Accordingly, installation is permitted, even if the device identification information is not registered in the management information, only if the external device identification information is registered therein. This ensures that the computer into which the authentication program is installed can be changed with ease.

In the case where one of the device identification information and the external device identification information included in the received installation request matches the corresponding one of the device identification information and the external device identification information included in the extracted management information but the other does not match the corresponding information, the device identification information and the external device identification information included in the extracted management information are updated with the device identification information and the external device identification information included in the installation request. In this manner, the information about the installation computer to which installation has been permitted can be kept up to date.

When installation computer 200 transmits to license management computer 100 an execution request including the program identification information, the device identification information, and the external device identification information after installation of the authentication program and before execution thereof, license management computer 100 receives the execution request. License management computer 100 searches HDD 107 for the management information including the same program identification information as the one included in the received execution request. If the management information including the same program identification information as the one included in the received execution request is extracted from HDD 107, license management computer 100 compares the device identification information and the external device identification information included in the received execution request respectively with the device identification information and the external device identification information included in the extracted management information. License management computer 100 permits execution of the authentication program to installation computer 200 on the conditions that the management information including the same program identification information as the one included in the received execution request is extracted and that the device identification information included in the received execution request matches the device identification information included in the extracted management information. This ensures that the authentication program is executed only by installation computer 200 to which the execution has been permitted.

Furthermore, installation computer 200 to which the authentication program has been installed acquires, as the external device identification information, the device identification information for identifying the respective MFPs 301 to 305 connected to installation computer 200 via network 3. That is, the device identification information for identifying MFPs 301 to 305 to be managed by installation computer 200 are used as the external device identification information. This ensures that one authentication program is installed into only one of a plurality of computers connected to a network.

While license management system 1 has been described in the above embodiment, the present invention may of course be understood as a license management method or a license management program which causes license management computer 100 to perform a license management process shown in FIGS. 8 and 9 and causes installation computer 200 to perform an installation process shown in FIG. 10 and a startup process shown in FIGS. 11 and 12.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A license management system including an installation computer and a license management computer connected via a network, the license management computer being configured to manage an application program installed into said installation computer, said installation computer comprising:

an installation request transmitting portion to transmit an installation request to said license management computer for installing the application program, the installation request including program identification information for identifying said application program, device identification information for identifying said installation computer, and external device identification information for specifying an external device connected to said installation computer via the network; and an installation portion to install said application program on the condition that said license management computer permits installation of said application program in response to said installation request transmitted, said license management computer comprising:

a management information storing portion to store management information, the management information including said program identification information, said device identification information, and said external device identification information;

an installation request receiving portion to receive said installation request that said installation computer transmits to said license management computer before installation of the application program;

an installation-time extracting portion to extract, from said management information storing portion, the management information including the same program identification information as the program identification information included in said received installation request;

a management information generating portion, in the case where the management information including the same program identification information as the program identification information included in said received installation request is not extracted by said installation-time extracting portion, to generate and store management information including the program identification information, the device identification information, and the external device identification information which are included in said received installation request;

an installation-time comparing portion, in the case where the management information including the same program identification information as the program identification information included in said received installation request is extracted by said installation-time extracting portion, to compare the device identification information and the external device identification information included in said received installation request respectively with the device identification information and the external device identification information included in said extracted management information;

an installation-time updating portion, in the case where said installation-time comparing portion determines that one of the device identification information and the external device identification information included in said received installation request matches the corresponding one of the device identification information and the external device identification information included in said extracted management information and the other does not match the corresponding information, to update the device identification information and the external device identification information included in said extracted management information with the device identification information and the external device identification information included in said installation request; and an installation management portion configured to permit installation of said application program to said installation computer in the case where the management information including the same program identification information as the program identification information included in said received installation request is not extracted by said installation-time extracting portion, or in the case where the management information including the same program identification information as the program identification information included in said received installation request is extracted by said installation-time extracting portion and said installation-time comparing portion determines that at least one of the device identification information and the external device identification information included in said received installation request matches the corresponding one of the device identification information and the external device identification information included in said extracted management information.

2. The license management system according to claim 1, wherein said installation computer further comprises a managed-device identification information acquiring portion to acquire, as said external device identification information, at least one piece of managed-device identification information for respectively identifying at least one device to be managed which is connected to said installation computer via the network.

3. The license management system according to claim 2, wherein said device to be managed is an image forming device.

4. The license management system according to claim 1, wherein said installation computer further comprises:

an execution requesting portion to transmit an execution request to said license management computer after said application program has been installed and before said application program is executed, the execution request including the program identification information for identifying said application program, said device identification information, and said external device identification information; and an execution control portion to execute said application program on the condition that said license management computer permits execution of said application program in response to said execution request transmitted to said license management computer before start of execution of said application program, and said license management computer further comprises:
an execution request receiving portion to receive said execution request transmitted from said installation computer;
an execution-time extracting portion to extract, from said management information storing portion, the management information including the same program identification information as the program identification information included in said received execution request;
an execution-time comparing portion, in the case where the management information including the same program identification information as the program identification information included in said received execution request is extracted by said execution-time extracting portion, to compare the device identification information and the external device identification information included in said received execution request respectively with the device identification information and the external device identification information included in said extracted management information; and
an execution management portion configured to permit execution of said application program to said installation computer on the conditions that the management information including the same program identification information as the program identification information included in said received execution request is extracted by said execution-time extracting portion and that said execution-time comparing portion determines that the device identification information included in said received execution request matches the device identification information included in said extracted management information.

5. The license management system according to claim 1, wherein said installation computer further comprises an accepting portion to accept external device identification information input by a user.

6. The license management system according to claim 5, wherein
said installation computer further comprises a changing portion to change said external device identification information, wherein
in the case where said external device identification information is changed by said changing portion after said application program has been installed, said execution requesting portion transmits to said license management computer an execution request including the program identification information for identifying said application program, said device identification information, and said changed external device identification information, and
in the case where said execution request is transmitted to said license management computer after said application program has been executed and if said license management computer does not permit execution of said application program, said execution control portion stops execution of said application program, and
said license management computer further comprises an execution-time updating portion, in the case where said execution-time comparing portion determines that the device identification information included in said received execution request matches the device identification information included in said extracted management information but the external device identification information included in said received execution request does not match the external device identification information included in said extracted management information, to update the external device identification information included in said extracted management information with the external device identification information included in said execution request.

7. The license management system according to claim 6, wherein
said installation computer further comprises:
a managed-device identification information acquiring portion to acquire, as said external device identification information, at least one piece of managed-device identification information for respectively identifying at least one device to be managed which is connected to said installation computer via the network; and
a management information storing portion to store said management information, wherein
in the case where said acquired at least one piece of managed-device identification information differs from said external device identification information, said changing portion changes said stored external device identification information with said acquired at least one piece of managed-device identification information.

8. The license management system according to claim 6, wherein
said installation computer further comprises an accepting portion to accept external device identification information input by a user, wherein
said changing portion changes said stored external device identification information with the external device identification information accepted by said accepting portion.

9. The license management system according to claim 1, wherein said device identification information is a unique code which is at least one of an Internet protocol (IP) address, a media access control (MAC) address, and a serial number.

10. A license management computer for managing an application program installed into an installation computer, the installation computer being connected to the license management computer via a network, the license management computer comprising:
a management information storing portion to store management information, the management information including program identification information for identifying an application program, device identification information for identifying said installation computer into which said application program is installed, and external device identification information for specifying an external device connected to said installation computer via the network;
an installation request receiving portion to receive an installation request that said installation computer transmits to said license management computer for installing the application program, the installation request including program identification information for identifying the application program to be installed, device identification information for identifying said installation computer, and said external device identification information;
an installation-time extracting portion to extract, from said management information storing portion, the management information including the same program identification information as the program identification information included in said received installation request;
a management information generating portion, in the case where the management information including the same program identification information as the program identification information included in said received installation request is not extracted by said installation-time extracting portion, to generate and store management information including the program identification information, the device identification information, and the external device identification information which are included in said received installation request;
an installation-time comparing portion, in the case where the management information including the same program identification information as the program identification information included in said received installation request is extracted by said installation-time extracting portion, to compare the device identification information and the external device identification information included in said received installation request respectively with the device identification information and the external device identification information included in said extracted management information;

an installation-time updating portion, in the case where said installation-time comparing portion determines that one of the device identification information and the external device identification information included in said received installation request matches the corresponding one of the device identification information and the external device identification information included in said extracted management information and the other does not match the corresponding information, to update the device identification information and the external device identification information included in said extracted management information with the device identification information and the external device identification information included in said installation request; and an installation management portion configured to permit installation of said application program to said installation computer in the case where the management information including the same program identification information as the program identification information included in said received installation request is not extracted by said installation-time extracting portion, or in the case where the management information including the same program identification information as the program identification information included in said received installation request is extracted by said installation-time extracting portion and said installation-time comparing portion determines that at least one of the device identification information and the external device identification information included in said received installation request matches the corresponding one of the device identification information and the external device identification information included in said extracted management information.

11. The license management computer according to claim 10, further comprising:

an execution request receiving portion to receive an execution request that said installation computer transmits to said license management computer after the application program has been installed and before said application program is executed, the execution request including said program identification information, said device identification information, and said external device identification information;

an execution-time extracting portion to extract, from said management information storing portion, the management information including the same program identification information as the program identification information included in said received execution request;

an execution-time comparing portion, in the case where the management information including the same program identification information as the program identification information included in said received execution request is extracted by said execution-time extracting portion, to compare the device identification information and the external device identification information included in said received execution request respectively with the device identification information and the external device identification information included in said extracted management information; and an execution management portion configured to permit execution of said application program to said installation computer on the conditions that the management information including the same program identification information as the program identification information included in said received execution request is extracted by said execution-time extracting portion and that said execution-time comparing portion determines that the device identification information included in said received execution request matches the device identification information included in said extracted management information.

12. The license management computer according to claim 10, wherein
the installation computer into which said application program has been installed acquires at least one piece of managed-device identification information for respectively identifying at least one device to be managed which is connected to said installation computer via the network, and
said external device identification information includes said at least one piece of managed-device identification information acquired by said installation computer.

13. The license management computer according to claim 10, wherein said external device identification information is input into said installation computer by a user.

14. The license management computer according to claim 10, wherein said device identification information is a unique code which is at least one selected from among an IP address, a MAC address, and a serial number.

15. A license management method performed by a license management computer connected to an installation computer in a communicable manner, said license management computer including a management information storing portion to store management information, the management information including program identification information for identifying an application program, device identification information for identifying said installation computer into which said application program is installed, and external device identification information for specifying an external device connected to said installation computer via a network,
the method comprising:

a receiving step of receiving an installation request that said installation computer transmits to said license management computer for installing an application program, the installation request including program identification information for identifying the application program to be installed, device identification information for identifying said installation computer, and external device identification information related to said installation computer;

an installation-time extracting step of extracting, from said management information storing portion, the management information including the same program identification information as the program identification information included in said received installation request;

a generating step of, in the case where the management information including the same program identification information as the program identification information included in said received installation request is not extracted in said installation-time extracting step, generating management information including the program identification information, the device identification information, and the external device identification information included in said received installation request and storing the generated management information in said management information storing portion;

an installation-time comparing step of, in the case where the management information including the same program identification information as the program identification information included in said received installation request is extracted in said installation-time extracting step, comparing the device identification information and the external device identification information included in said received installation request respectively with the device identification information and the external device identification information included in said extracted management information;

an updating step of, in the case where it is determined in said installation-time comparing step that one of the device identification information and the external device identification information included in said received installation request matches the corresponding one of the device identification information and the external device identification information included in said extracted management information and the other does not match the corresponding information, updating the device identification information and the external device identification information included in said extracted management information with the device identification information and the external device identification information included in said installation request; and a permitting step of permitting installation of said application program to said installation computer in the case where the management information including the same program identification information as the program identification information included in said received installation request is not extracted in said installation-time extracting step, or in the case where the management information including the same program identification information as the program identification information included in said received installation request is extracted in said installation-time extracting step and it is determined in said installation-time comparing step that at least one of the device identification information and the external device identification information included in said received installation request matches the corresponding one of the device identification information and the external device identification information included in said extracted management information.

16. A license management program embodied on a non-transitory computer readable medium and executed in a license management computer connected to an installation computer in a communicable manner, said license management computer including a management information storing portion to store management information, the management information including program identification information for identifying an application program, device identification information for identifying said installation computer into which said application program is installed, and external device identification information for specifying an external device connected to said installation computer via a network, the program causing said license management computer to perform:

a receiving step of receiving an installation request that said installation computer transmits to said license management computer for installing an application program, the installation request including program identification information for identifying the application program to be installed, device identification information for identifying said installation computer, and external device identification information related to said installation computer;

an installation-time extracting step of extracting, from said management information storing portion, the management information including the same program identification information as the program identification information included in said received installation request;

a generating step of, in the case where the management information including the same program identification information as the program identification information included in said received installation request is not extracted in said installation-time extracting step, generating management information including the program identification information, the device identification information, and the external device identification information included in said received installation request and storing the generated management information in said management information storing portion;

an installation-time comparing step of, in the case where the management information including the same program identification information as the program identification information included in said received installation request is extracted in said installation-time extracting step, comparing the device identification information and the external device identification information included in said received installation request respectively with the device identification information and the external device identification information included in said extracted management information;

an updating step of, in the case where it is determined in said installation-time comparing step that one of the device identification information and the external device identification information included in said received installation request matches the corresponding one of the device identification information and the external device identification information included in said extracted management information and the other does not match the corresponding information, updating the device identification information and the external device identification information included in said extracted management information with the device identification information and the external device identification information included in said installation request; and a permitting step of permitting installation of said application program to said installation computer in the case where the management information including the same program identification information as the program identification information included in said received installation request is not extracted in said installation-time extracting step, or in the case where the management information including the same program identification information as the program identification information included in said received installation request is extracted in said installation-time extracting step and it is determined in said installation-time comparing step that at least one of the device identification information and the external device identification information included in said received installation request matches the corresponding one of the device identification information and the external device identification information included in said extracted management information.

* * * * *